United States Patent
Wykydal

(10) Patent No.: US 9,849,482 B2
(45) Date of Patent: Dec. 26, 2017

(54) HYDRAULIC PUMP AND PISTON FOR SUCH A HYDRAULIC PUMP

(71) Applicant: HYDAC DRIVE CENTER GMBH, Langenau (DE)

(72) Inventor: Bernd Wykydal, Giengen (DE)

(73) Assignee: HYDAC DRIVE CENTER GMBH, Langenau (DE)

( * ) Notice: Subject to any disclaimer, the term of this patent is extended or adjusted under 35 U.S.C. 154(b) by 66 days.

(21) Appl. No.: 14/778,132

(22) PCT Filed: May 16, 2014

(86) PCT No.: PCT/EP2014/001328
§ 371 (c)(1),
(2) Date: Sep. 18, 2015

(87) PCT Pub. No.: WO2014/187547
PCT Pub. Date: Nov. 27, 2014

(65) Prior Publication Data
US 2016/0153431 A1    Jun. 2, 2016

(30) Foreign Application Priority Data

May 22, 2013  (DE) .................. 10 2013 008 629
May 22, 2013  (DE) .................. 10 2013 008 676
(Continued)

(51) Int. Cl.
*F01B 31/08*    (2006.01)
*B05D 5/08*    (2006.01)
(Continued)

(52) U.S. Cl.
CPC .............. *B05D 5/08* (2013.01); *B05D 3/002* (2013.01); *B05D 3/0254* (2013.01); *B05D 3/12* (2013.01);
(Continued)

(58) Field of Classification Search
CPC .... F04B 1/124; F04B 27/0878; F01B 3/0085; F16J 1/005
(Continued)

(56) References Cited

U.S. PATENT DOCUMENTS 2,825,241 A    3/1958   Ferris
2,925,046 A    2/1960   Budzich
(Continued)

FOREIGN PATENT DOCUMENTS

DE    1 653 617    7/1971
DE    25 31 616    2/1977
(Continued)

OTHER PUBLICATIONS

International Search Report (ISR) dated Sep. 23, 2014 in International (PCT) Application No. PCT/EP2014/001328.

*Primary Examiner* — Michael Leslie
(74) *Attorney, Agent, or Firm* — Wenderoth, Lind & Ponack, L.L.P.

(57) ABSTRACT

A hydraulic pump, in particular an adjustable axial piston pump, has at least one piston (22) movable in a reciprocating manner in a longitudinal direction within a pump housing during operation of the hydraulic pump. The piston (22) has a link head (24), a piston top (54) opposite the link head (24), and at least one hollow chamber (60) surrounded at least partially by a piston housing (62) that substantially or completely terminates each hollow chamber (60) towards the outside. A piston (22) for such hydraulic pump is also provided.

19 Claims, 3 Drawing Sheets

(30) Foreign Application Priority Data

| | | |
|---|---|---|
| May 22, 2013 | (DE) | 10 2013 008 677 |
| May 22, 2013 | (DE) | 10 2013 008 678 |
| May 22, 2013 | (DE) | 10 2013 008 679 |
| May 22, 2013 | (DE) | 10 2013 008 681 |

(51) Int. Cl.

| | |
|---|---|
| *F01B 3/10* | (2006.01) |
| *F03C 1/40* | (2006.01) |
| *F04B 27/08* | (2006.01) |
| *F16J 1/00* | (2006.01) |
| *F01B 3/00* | (2006.01) |
| *F04B 1/12* | (2006.01) |
| *F04B 1/20* | (2006.01) |
| *F04B 1/30* | (2006.01) |
| *F04B 1/32* | (2006.01) |
| *F04B 49/08* | (2006.01) |
| *F04B 53/14* | (2006.01) |
| *F03C 1/28* | (2006.01) |
| *C23C 24/10* | (2006.01) |
| *F16C 33/14* | (2006.01) |
| *F04B 11/00* | (2006.01) |
| *B05D 3/00* | (2006.01) |
| *B05D 3/02* | (2006.01) |
| *B05D 3/12* | (2006.01) |
| *F04B 1/14* | (2006.01) |
| *F04B 19/22* | (2006.01) |
| *F04B 1/22* | (2006.01) |

(52) U.S. Cl.
CPC .......... *C23C 24/106* (2013.01); *F01B 3/0085* (2013.01); *F01B 3/106* (2013.01); *F03C 1/0605* (2013.01); *F03C 1/0686* (2013.01); *F04B 1/124* (2013.01); *F04B 1/126* (2013.01); *F04B 1/146* (2013.01); *F04B 1/2035* (2013.01); *F04B 1/2064* (2013.01); *F04B 1/2071* (2013.01); *F04B 1/2078* (2013.01); *F04B 1/2085* (2013.01); *F04B 1/2092* (2013.01); *F04B 1/22* (2013.01); *F04B 1/303* (2013.01); *F04B 1/32* (2013.01); *F04B 1/324* (2013.01); *F04B 11/0091* (2013.01); *F04B 19/22* (2013.01); *F04B 27/0878* (2013.01); *F04B 49/08* (2013.01); *F04B 53/14* (2013.01); *F16C 33/14* (2013.01); *F16J 1/005* (2013.01); *F16C 2204/34* (2013.01); *F16C 2223/46* (2013.01); *F16C 2360/00* (2013.01)

(58) Field of Classification Search
USPC .................................................. 92/157, 176
See application file for complete search history.

(56) References Cited

U.S. PATENT DOCUMENTS

| | | | |
|---|---|---|---|
| 4,028,010 A | | 6/1977 | Hopkins |
| 4,191,095 A | * | 3/1980 | Heyl ..................... F01B 3/0085 92/158 |
| 4,743,179 A | | 5/1988 | Wass et al. |
| 5,553,378 A | * | 9/1996 | Parekh .................... F04B 1/124 29/888.042 |
| 6,274,083 B1 | * | 8/2001 | Clark, III ................ F04B 1/124 419/40 |
| 6,662,709 B1 | * | 12/2003 | Beutler ................... F04B 1/124 92/176 |
| 7,458,313 B2 | * | 12/2008 | Beck ....................... F04B 1/124 92/176 |
| 7,650,829 B2 | * | 1/2010 | Beck ....................... F04B 1/124 92/176 |
| 9,593,774 B2 | * | 3/2017 | Baeriswyl ............... F04B 1/124 |
| 2001/0047720 A1 | * | 12/2001 | Hoshida ............. F04B 27/0878 92/176 |
| 2002/0187055 A1 | | 12/2002 | Nelson et al. |
| 2004/0101419 A1 | | 5/2004 | Nelson |
| 2005/0226737 A1 | | 10/2005 | Gandrud et al. |

FOREIGN PATENT DOCUMENTS

| | | |
|---|---|---|
| DE | 26 53 867 | 6/1978 |
| DE | 26 53 868 | 6/1978 |
| DE | 31 35 605 | 3/1983 |
| DE | 35 45 137 | 7/1987 |
| DE | 36 02 651 | 8/1987 |
| DE | 28 29 597 | 9/1988 |
| DE | 40 28 852 | 3/1991 |
| DE | 43 01 140 | 7/1993 |
| DE | 40 24 319 | 10/1993 |
| DE | 42 14 765 | 11/1993 |
| DE | 196 20 167 | 3/1997 |
| DE | 197 06 114 | 8/1998 |
| DE | 102 35 813 | 2/2004 |
| DE | 601 18 246 | 3/2007 |
| DE | 10 2008 027 700 | 12/2009 |
| DE | 10 2011 053 423 | 2/2013 |
| EP | 0 608 144 | 7/1994 |
| EP | 1 013 928 | 6/2000 |
| EP | 1 264 985 | 12/2002 |
| EP | 2 327 490 | 6/2011 |
| FR | 2 785 525 | 5/2000 |
| JP | 8-144941 | 6/1996 |
| JP | 8-284805 | 10/1996 |
| JP | 11-257210 | 9/1999 |
| WO | 2009/129820 | 10/2009 |

\* cited by examiner

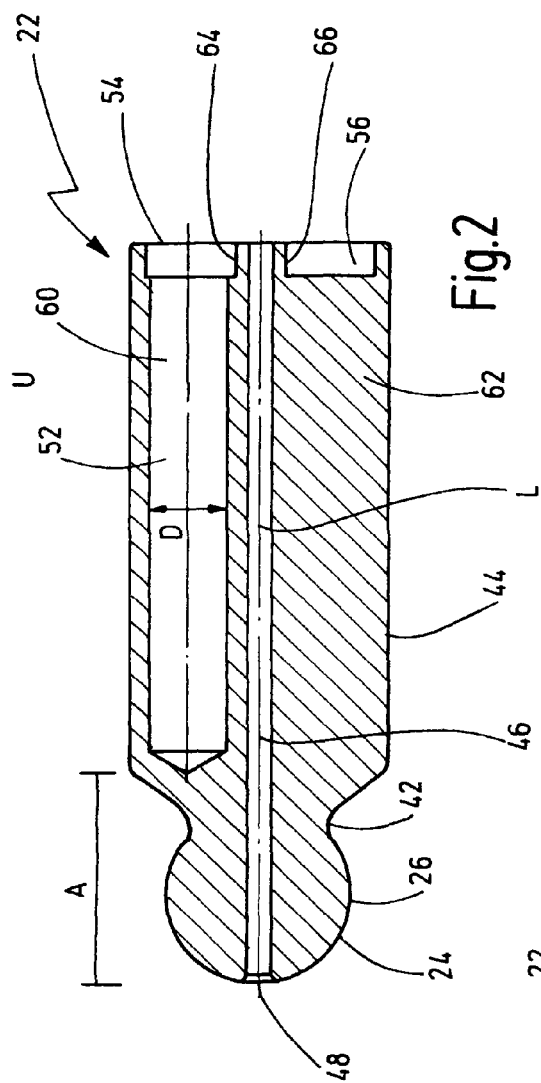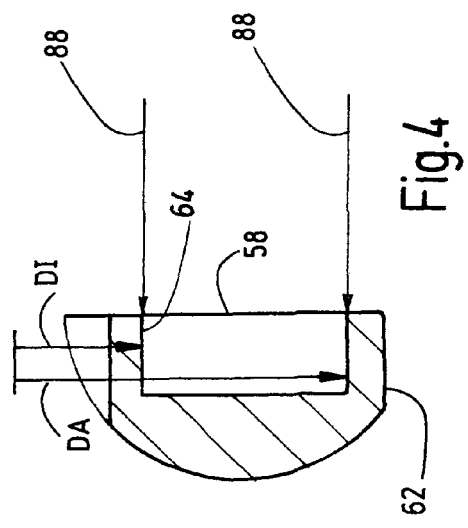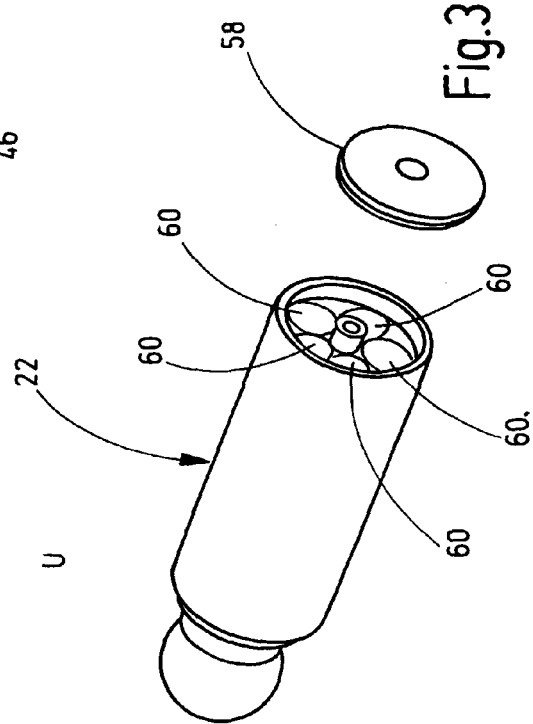

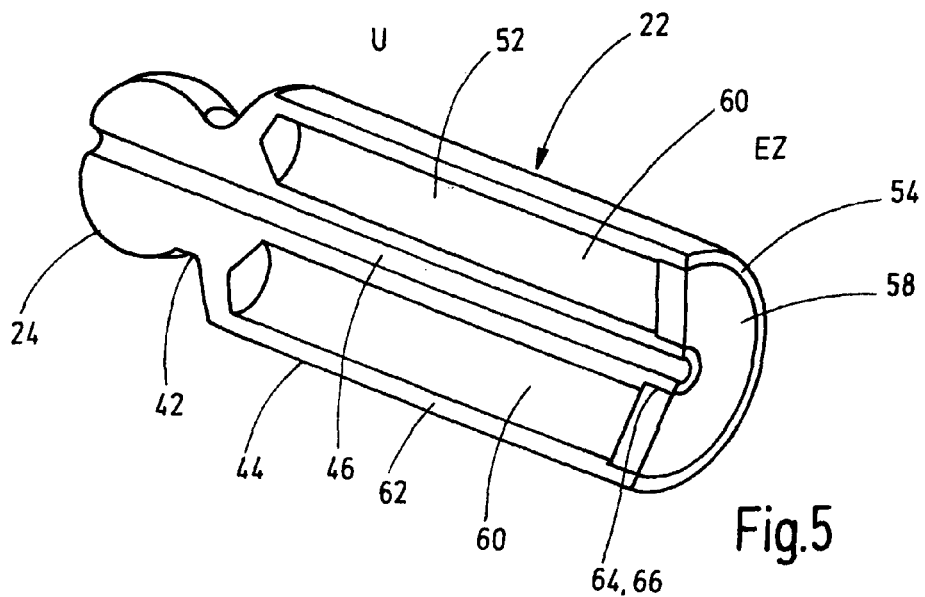
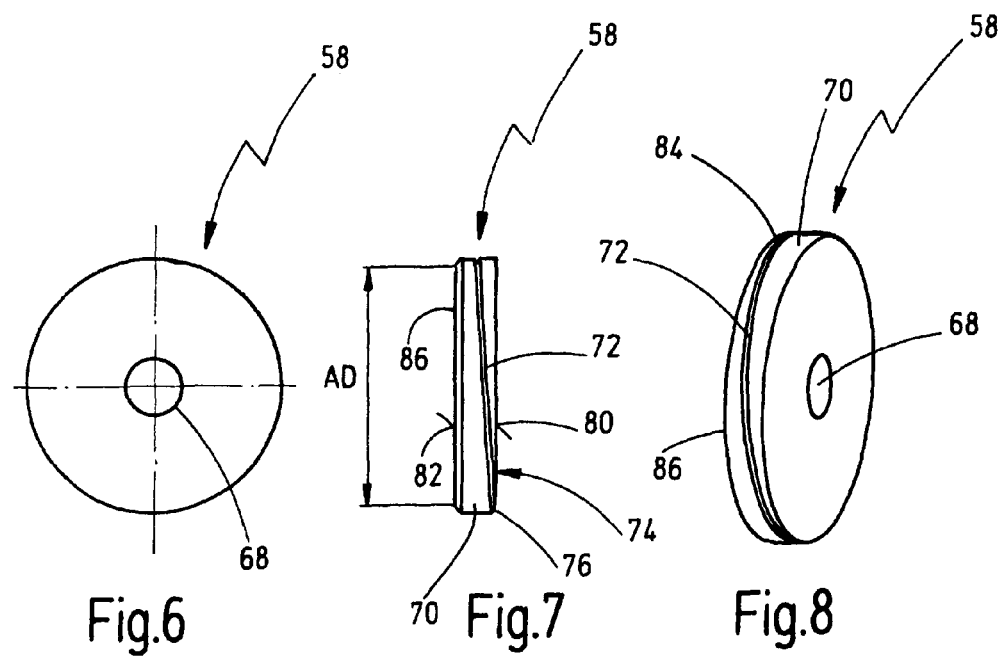

HYDRAULIC PUMP AND PISTON FOR SUCH A HYDRAULIC PUMP

FIELD OF THE INVENTION

The invention relates to a hydraulic pump, in particular an adjustable axial piston pump, as well as a piston for such a hydraulic pump.

BACKGROUND OF THE INVENTION

In the operation of a hydraulic, adjustable axial piston pump, mechanical energy is converted to hydrostatic energy. The mechanical energy is supplied, for example, by an electric motor. In the structure of an axial piston pump, hydraulic pumps of this type normally have numerous cylinders, which are attached to a rotatable shaft such that they extend in the axial direction, and are disposed on a partial circle, offset at a radius to the shaft axis. Pistons are displaceably disposed in the cylinders. The pistons, which rotate with the cylinder, are moved, for example, by an adjustable inclined plate. For this movement, in order to minimize the friction, a piston/sliding shoe connection is provided between the inclined plate and the pistons.

One problem of conventional axial piston pumps is the mass of the rotating piston, which is normally made of a single piece. Because of this mass, significant energy is needed to accelerate the piston, and to subsequently decelerate it, this energy being associated with significant wear in the region of the piston/sliding shoe connection. In order to reduce the inertia of the mass, a bore hole has been provided previously, in the base of the piston, such that the piston is substantially hollow. A bore hole of this type in the piston has the disadvantage, however, that the dead volume in the cylinder is increased. As a result of the dead volume, there are compression losses and increased volume flow, or pressure, fluctuations, which are a reflection of a lower pumping efficiency.

SUMMARY OF THE INVENTION

An object of the invention is to provide an improved hydraulic pump and a piston for such hydraulic pump, with which, or by which, respectively, the efficiency of the hydraulic pump is or will be increased.

The first part of the object is achieved by a hydraulic pump. The second part of the object is achieved by a piston.

According to the invention, the pump, in particular in the form of an adjustable axial piston pump, has at least one piston that can move back and forth in a longitudinal direction inside a pump housing during operation of the hydraulic pump. The piston has a link head and a piston base lying opposite the link head, as well as at least one hollow chamber. The hollow chamber is encompassed, at least partially, by a piston housing. The piston housing closes the respective hollow chamber, substantially or entirely, to the outside.

To the extent that reference is made, presently and below, to the hollow chamber being substantially closed off to the outside, this reference means that, starting from the environment, no relevant media discharge, in particular in the form of a fluid, occurs through any existing openings in the piston housing and/or in its end piece, taking the form of a lid, for example, into the interior of the respective hollow chamber. An effective barricade of this type can still be achieved when the hollow chamber is substantially closed, even when, for example, openings are to be formed in the piston housing, such as capillary holes. Substantially closed thus means that even when such openings are formed, passing through the hollow chamber, these openings nevertheless prevent, in a damping manner, or prohibit, in the manner of a capillary hole, accordingly, the flow through, in the manner of a choke or a screen.

The hydraulic pump according to the invention is distinguished in that the advantage of having a piston with a lower mass is not obtained at the cost of having a larger dead volume as a result of a hollow chamber that is open to the pump housing. Consequently, the inertia forces are advantageously reduced with a minimized dead volume in the cylinder. Consequently, the efficiency of the hydraulic pump is improved, because less energy must be used in order to convey the same quantity of fluid. Furthermore, a hydraulic pump of this type is distinguished by less wear in the region of the piston/sliding shoe connection.

In a particularly advantageous manner, the at least one hollow chamber extends in the direction of the longitudinal axis or parallel to the longitudinal axis of the piston in the piston housing, and passes through the piston, starting from an axial spacing of the link head to the piston base. A bore hole of this type can be readily made in the piston, starting from the piston base. An eccentric configuration of the at least one hollow chamber has the advantage that, in addition to the hollow chamber, a concentric through hole can be provided in the piston, in order to be able to relieve and lubricate the link head during the operation of the hydraulic pump.

Advantageously, the at least one hollow chamber is closed by the piston housing or by a lid that can be attached to the piston housing. With the lid solution in particular, there is the possibility of providing the hollow chamber in the form of a bore hole in the piston, and to subsequently close the hollow chamber with the lid. The lid can likewise be produced as a rotating part, and be placed in the piston housing with no substantial gaps. As a result, fissures are prevented during the subsequent welding, and it is possible to entirely seal the hollow chamber.

The lid and/or the piston can have an equalizing mechanism, which connects the at least one hollow chamber to the environment in a media conducting manner. The development of excess pressure in the hollow chamber can be prevented by the equalizing mechanism, which pressure could lead to process instabilities during the joining.

The equalizing mechanism can comprise a spiral groove along an outer circumferential surface of the lid, which is covered when the lid is placed in the housing by the piston housing, except for at a discharge point. The discharge point forms, as part of the equalizing mechanism, the media conducting connection, via the spiral groove, between the environment and the at least one hollow chamber in the piston. An excess pressure can be dissipated during the overall process of inserting the lid in the piston housing by the spiral groove.

Particularly advantageously, the spiral groove opens into a bevel in the lid, or borders this bevel. At its other end, the intake point lies opposite the discharge point. The outer diameter of the bevel preferably decreases continuously toward the link head, up to a final diameter. As a result of this bevel, with numerous hollow chambers, they are all ventilated in a uniform manner during the joining of the lid.

The piston housing can advantageously have a head part at the piston base. By the head part, the lid can be coupled to the piston base, preferably by welding or brazing. The head part forms a guide and/or attachment possibility for the lid on the piston housing. In this manner, the orientation of the lid is ensured. This structure is particularly advantageous in the case of a subsequent welding of the lid to the piston housing.

The lid can be permanently connected to the piston housing by brazing or an electron beam welding process. The piston can preferably be heat treated after the welding. Prior to brazing, the piston housing and the lid are rough-turned, so that the brazing gap between the lid and the piston housing, in particular the walls of the piston housing, is 80 µm to 120 µm, to obtain an optimal capillary effect, such that the brazing gap between the piston and the lid fills with solder. The lid should additionally be provided with a sufficiently large bevel on the side facing the bore holes to prevent oxidation during the brazing in a vacuum. After the turning, the lid is inserted in the piston housing, and the two are non-detachably connected to one another in a material bonded manner in a vacuum, using a metallic filler material, a solder, at 450° C. to 1,200° C. This process is also referred to as joint soldering. The hollow chamber formed by the bore holes is closed in this manner. As a result, the dead volume of the piston cannot increase during the ongoing operation due to a leak in the piston housing/lid connection.

The electron beam welding seam advantageously closes at least the discharge point of the spiral groove. In this manner, an entry of fluid into the at least one hollow chamber of the piston is impeded significantly.

Preferably numerous hollow chambers are in the piston, preferably having the same diameter, provided on a partial circle, offset to one another. This arrangement enables the volume of the hollow chamber to be maximized, and at the same time, a central bore hole extending in the direction of the longitudinal axis to be provided, which can be used for lubricating the link head during ongoing operation.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is a side view in section of the piston of FIG. 1;

FIG. 3 is a perspective view of the piston with a lid of FIG. 1;

FIG. 4 is a side view in section of the piston of FIG. 2, wherein the production of the electron beam welding seam is shown;

FIG. 5 is a perspective view of a piston according to the invention, having a lid affixed thereto; and FIGS. 6 to 8 are a top view, a side view, and a perspective view of the lid, respectively.

DETAILED DESCRIPTION OF THE INVENTION

Figure 1:
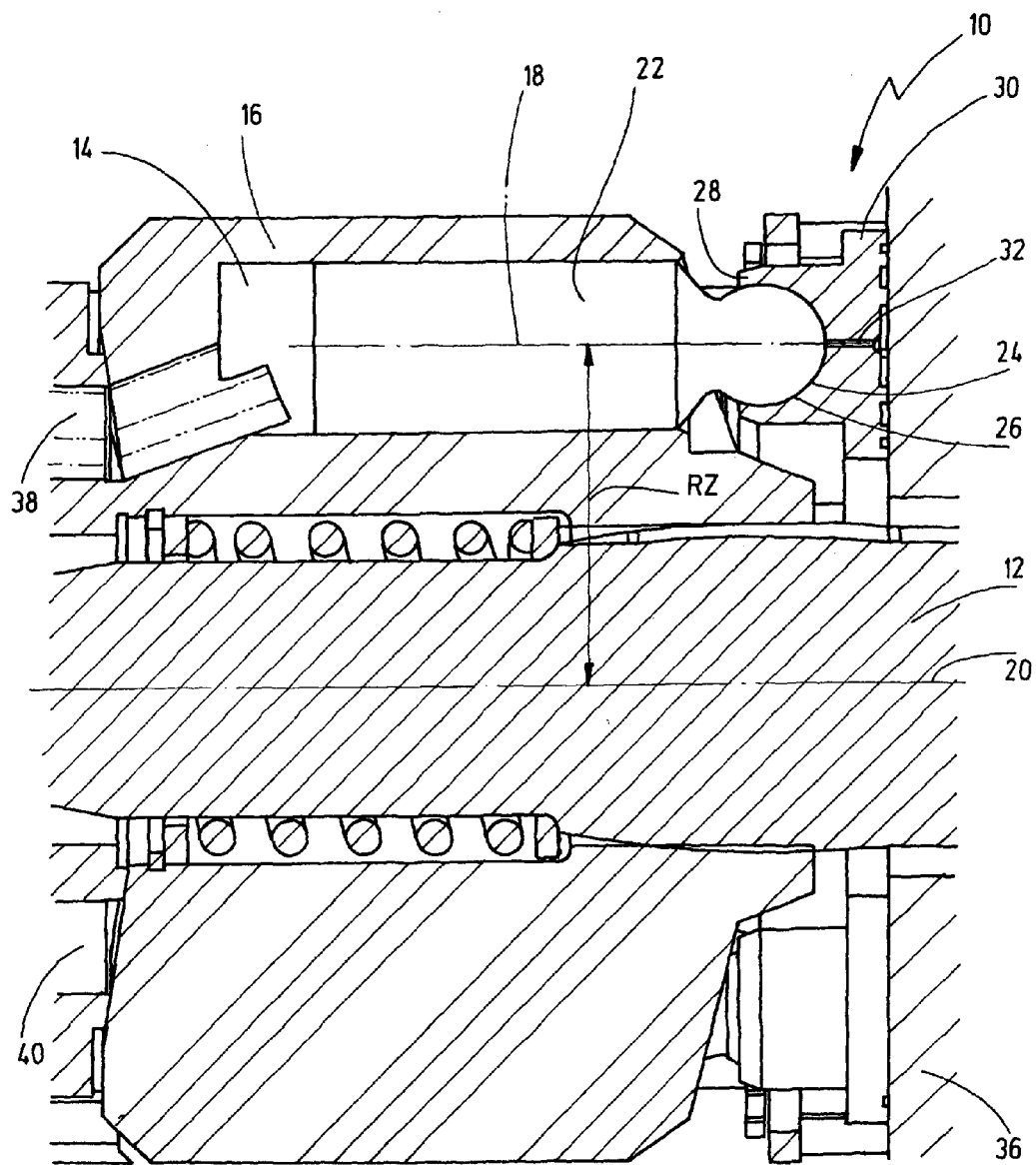
FIG. 1 is a side view in section through an axial piston pump according to an exemplary embodiment of the invention.

A detail of a hydraulic pump 10 in the form of an axial piston pump is shown in cross section in FIG. 1. Stationary cylinders 14 are disposed on a rotatable shaft 12 as part of the pump housing 16, such that the cylinders 14 rotate together with the shaft 12. An odd number of cylinders 14 are provided, which are disposed on a partial circle, circumferentially offset to one another. The longitudinal axes 18 of the cylinders 14 all have the same radius RZ to the longitudinal axis 20 of the shaft 12. A piston 22 that can be displaced longitudinally is disposed in each cylinder 14. A spherical surface 26 is provided on a link head 24 of each piston 22, which is retained in a corresponding receiving part 28 of a sliding shoe 30. Each sliding shoe 30 is provided with a longitudinal bore 32 for lubricating the receiving part 28. The sliding shoe 30 is supported on an adjustment mechanism such that it can slide, with an inclined plate 36 disposed therebetween. A fluid, in particular a hydraulic fluid, can be drawn into the cylinder 14 in a first stroke via a fluid inlet 38. The fluid can be subsequently discharged from the cylinder 14 in a second stroke via a fluid outlet 40. Thus, during a half rotation of the shaft 12, a cylinder 14 is filled, and during the other half of the rotation of the shaft 12, it is again emptied. A high and uniform pump performance can be obtained in this manner.

Each piston 22 according to the invention is shown in detail in FIGS. 2 to 5. The piston 22 has a link head 24, which transitions via a neck 42 into a piston body 44. The link head 24 has the spherical surface 26. A through hole 46 extends through the piston 22, which is beveled at one end 48. A total of five axial bore holes 52 having the same diameter D are provided parallel to the through hole 46, and thus, to the longitudinal axis L of the piston 22. These extend from the piston base 54 toward the link head 24 and terminate at an axial spacing A to the link head 24. An annular recess 56 for a lid 58 is provided on the piston base 54. The bore holes 52 of the piston 22 form hollow chambers 60, which are disposed on a partial circle, circumferentially offset to one another. Thus, the hollow chambers 60 are provided in a piston housing 62. As a result of the annular recess 56, a protruding wall section 64 of the through bores 46 remains intact. This wall section 64 forms a coupling part 66 for the lid 58 that is to be coupled thereto, and centers this lid when it is inserted.

As is shown more clearly in FIGS. 6 to 8, the lid 58 is a disk-shaped rotating part having a central bore hole 68 corresponding to the outer diameter of the protruding wall section 64. A spiral groove 72 is provided, as a part of an equalizing mechanism 74, on the outer circumferential surface 70 of the lid 58. Groove 72 connects the hollow chambers 60 to the environment U in a media conducting manner. When the lid 58 has been placed in the piston housing 62, the spiral groove 72 is covered by the piston housing 62, except for at a discharge point 76. The discharge point 76, as a part of the equalizing mechanism, establishes the media conducting connection between the environment U and the hollow chambers 60 in the piston 22 via the spiral groove 72. The discharge point 76 is disposed on a back surface 80 of the lid 58. The spiral groove 72 opens into an intake point 84 in a bevel 86 at the opposite, front surface 82. The outer diameter of the bevel 86 decreases toward the link head 24, up to a final diameter AD, when the lid 58 is in the inserted state EZ.

As FIG. 4 shows in greater detail, after the lid 58 has been inserted into the piston housing 62, the lid 58 is welded, using an electron beam welding process, along the entire circumference of its internal diameter DI and its external diameter DA. As a result, the discharge point 76 is also closed. The electron beam 88 is oriented parallel to the longitudinal axis L of the piston 22 thereby, to enable the most efficient possible welding. For this welding, the lid 58 should be inserted and oriented in the piston housing 62 without gaps to prevent the formation of fissures during the welding. The electron beam welding is carried out in a vacuum, in accordance with DIN 4063. This welding involves an I-axial seam, in which the electron beam 88 is parallel to the longitudinal axis L. As a result of the welding, the hollow chambers 60 are entirely closed off to the environment U to the outside. After the welding, the piston 22 is finished and heat treated.

The finished piston 22 is depicted in FIG. 5 in a perspective sectional view. It is distinguished by a reduced mass, due to the hollow chambers 60. The lid 58 prevents an increase in the dead volume in the cylinder 14. In this manner, no additional compression losses can occur through the hollow chambers 60. As a result, the efficiency of the hydraulic pump 10 is advantageously improved.

While one embodiment has been chosen to illustrate the invention, it will be understood by those skilled in the art that various changes and modifications can be made therein without departing from the scope of the invention as defined in the claims.

The invention claimed is:

1. A hydraulic axial piston pump, comprising:
    a pump housing;
    at least one piston movable in opposite axial directions along a longitudinal axis of said piston inside said pump housing during operation of the pump, said piston having a link head, having a piston base opposite said link head, having a through-hole extending through said link head and said piston base and having at least one hollow chamber therein, said hollow chamber being at least partially encompassed by a piston housing substantially or entirely closing said hollow chamber to an outside of said piston, said hollow chamber being closed by a lid connected to said piston housing; and
    an equalizer in said piston housing or said lid connecting said hollow chamber to an environment outside of said piston chamber in a media conducting or fluid communication manner at said piston base to prevent excess pressure in said hollow chamber during joining of said lid to said piston housing.

2. A hydraulic axial piston pump according to claim 1 wherein
    said hollow chamber extends in a direction of or parallel to said longitudinal axis in said pump housing and extends through said piston from an axial spacing coupled to said link head to said piston base.

3. A hydraulic axial piston pump according to claim 1 wherein
    said equalizer comprises a spiral groove extending along an outer circumferential surface of said lid, said spiral groove being covered by said piston housing along an entire length thereof, except for a discharge end of said spiral path providing a fluid communication between an environment outside of said hollow chamber and inside of said hollow chamber.

4. A hydraulic axial piston pump according to claim 3 wherein
    said spiral groove opens into said hollow chamber at a bevel on said lid at an input end of said spiral groove opposite said discharge end.

5. A hydraulic axial piston pump according to claim 4 wherein
    said bevel has an outer diameter decreasing continuously toward said link head until reaching a final diameter.

6. A hydraulic axial piston pump according to claim 1 wherein
    said piston housing comprises a coupling part on said piston base coupling said lid to said piston base.

7. A hydraulic axial piston pump according to claim 6 wherein
    said lid is welded or brazed to said piston base.

8. A hydraulic axial piston pump according to claim 1 wherein
    said lid is permanently connected to said piston housing by a brazing or an electron beam weld.

9. A hydraulic axial piston pump according to claim 8 wherein,
    said piston is heat treated after welding.

10. A hydraulic axial piston pump according to claim 3 wherein
    an electron beam weld connects said lid to said piston base and closes said discharge end of said spiral groove.

11. A hydraulic axial piston pump according to claim 1 wherein
    said piston comprises plural hollow chambers arranged on a partial circle and circumferentially offset relative to one another in said piston housing.

12. A hydraulic axial piston pump according to claim 11 wherein
    each of said hollow chambers has an equal transverse diameter.

13. A hydraulic axial piston pump according to claim 1 wherein
    said lid closes and is inserted in said piston housing at said piston base, said equalizer extends between said housing base and said lid.

14. A hydraulic axial piston pump according to claim 1 wherein
    said lid closes and is inserted in said piston housing at said piston base, said equalizer extends in said lid.

15. A piston for a hydraulic axial piston pump, the piston comprising:
    a piston housing;
    a link head at one end of said piston housing;
    a piston base at an opposite end of said piston housing;
    a through-hole extending through said link head and said piston base;
    at least one hollow chamber in said piston housing, said hollow chamber being at least partially encompassed by a piston housing substantially or entirely closing said hollow chamber to an outside of said piston housing, said hollow chamber being closed by a lid connected to said piston housing; and
    an equalizer in said piston housing or said lid connecting said hollow chamber to an environment outside of said piston chamber in a media conducting or fluid communication manner at the piston base to prevent excess pressure in said hollow chamber during joining of said lid to said piston housing.

16. A piston according to claim 15 wherein
    said hollow chamber extends in a direction of or parallel to said longitudinal axis in said pump housing and extends through said piston housing from an axial spacing coupled to said link head to said piston base.

17. A piston according to claim 15 wherein
    said equalizer comprises a spiral groove extending along an outer circumferential surface of said lid, said spiral groove being covered by said piston housing along an entire length thereof, except for a discharge end of said spiral path providing a fluid communication between an environment outside of said hollow chamber and inside of said hollow chamber.

18. A piston according to claim 17 wherein
said spiral groove opens into said hollow chamber at a
   bevel on said lid at an input end of said spiral groove
   opposite said discharge end.
19. A piston according to claim 18 wherein
said bevel has an outer diameter decreasing continuously
   toward said link head until reaching a final diameter.

\* \* \* \* \*